United States Patent
Bystrom et al.

[11] 3,783,547
[45] Jan. 8, 1974

[54] FISHING ROD HOLDER

[76] Inventors: Andrew G. C. Bystrom, 4901 Trillium Ln., Minneapolis, Minn. 55435; Mikeal G. Bystrom, 6106 Park Ave., Minneapolis, Minn. 55417

[22] Filed: Nov. 13, 1972

[21] Appl. No.: 306,367

[52] U.S. Cl. .................. 43/21.2, 248/42, 287/87
[51] Int. Cl. .......................................... A01k 97/10
[58] Field of Search ................ 43/21.2, 23; 248/39, 248/42; 287/87

[56] References Cited
UNITED STATES PATENTS

| | | | |
|---|---|---|---|
| 1,013,734 | 1/1912 | Boyd | 43/21.2 UX |
| 2,115,629 | 4/1938 | Gurley | 287/87 X |
| 2,680,924 | 6/1954 | Menegay | 43/21.2 |
| 2,743,067 | 4/1956 | Stratton | 43/21.2 X |
| 3,409,317 | 11/1968 | Richards | 287/87 X |

FOREIGN PATENTS OR APPLICATIONS 722,451  12/1931  France ................................ 287/87

Primary Examiner—Louis G. Mancene
Assistant Examiner—James H. Czerwonky
Attorney—Orrin M. Haugen

[57] ABSTRACT

A fishing rod holder arranged to receive the butt end of a fishing rod and including a generally cylindrical tube having a closed bottom and an open top with mounting means at the base thereof to secure said holder to a stationary surface. The mounting means includes a ball, with the base of the tube having a socket formed therein, and with clamping means including a transversely mounted screw and a compression block, being provided at the base of the tube to lockingly retain the tube in predetermined disposition. The screw has relatively movable clamping members mounted thereon to urge the block towards the ball.

3 Claims, 6 Drawing Figures

PATENTED JAN 8 1974 3,783,547

FISHING ROD HOLDER

BACKGROUND OF THE INVENTION

The present invention relates generally to an improved fishing rod holder, and more particularly to a fishing rod holder having means for releasably locking the holder in a predetermined disposition relative to a stationary mount.

Anglers frequently require a rod holder for receiving the base or butt end of the rod while reeling in or playing a fish. Particularly, in salt water fishing, it is frequently desirable that the angler have a means for retaining the butt end of the rod while working the reel for the purpose of playing or landing the fish. These rod holders are normally secured to a stationary mounting base, such as, for example, the gunnel of the boat, the oarlock of a boat, or the like. In addition, rod holders may frequently be mounted upon a stationary surface such as a dock or the like.

In the use of rod holders, the angler will frequently wish to adjust the position of the holder depending upon the demands of the immediate situation. The number of persons in the immediate area, as well as the nature of the immediate fishing situation may require controllable adjustment of the holder. Once the holder has been arranged in desired disposition, it is locked in place and rendered ready for use.

In the past, rod holders have been proposed which are either stationary, or, when adjustable, only adjustable with difficulty. The rod holder of the present invention is readily adjustable, and once secured, will not shift or move so as to permit uncontrolled release of the rod when it is placed within the holder and a force applied to the rod. Such uncontrolled release of the rod from the holder can result in loss of the fish, or, in some cases, loss of the equipment.

SUMMARY OF THE INVENTION

Therefore, it is a primary object of the present invention to provide an improved rod holder which may be adjustably locked in predetermined disposition.

It is yet a further object of the present invention to provide an improved rod holder for anglers which is readily adjustable in any desired angular disposition relative to the mounting surface.

Other and further objects of the present invention will become apparent to those skilled in the art upon a study of the following specification, appended claims and accompanying drawings.

DESCRIPTION OF THE PREFERRED EMBODIMENT

Figure 1:
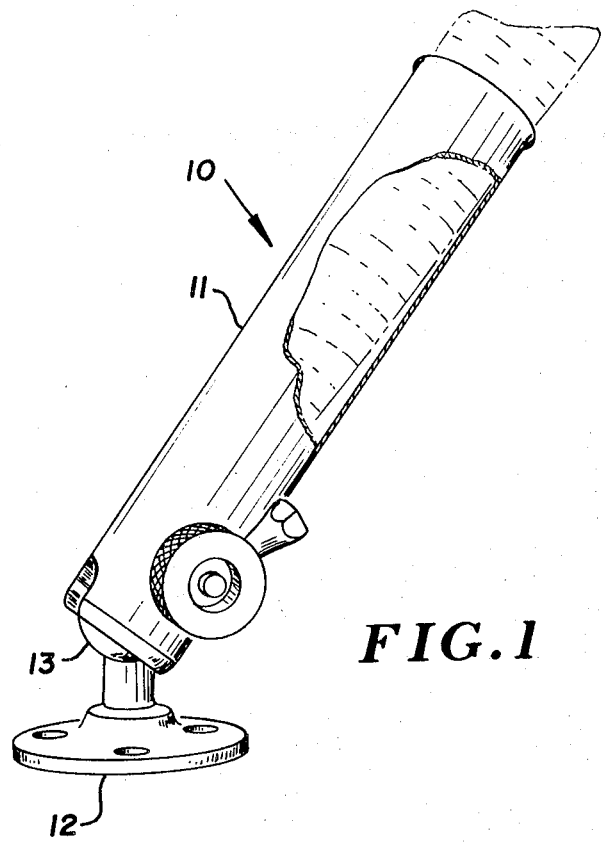
FIG. 1 is a perspective view of the rod holder of the present invention, with a portion of the structure being shown broken away to permit viewing a rod handle disposed within the holder.
Figure 3:
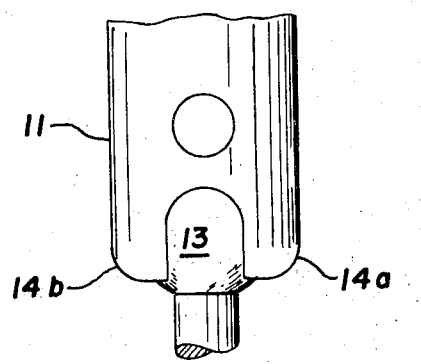
FIG. 3 is a partial side elevational view taken along the line and in the direction of the arrows 3—3 of FIG. 2.
Figure 2:
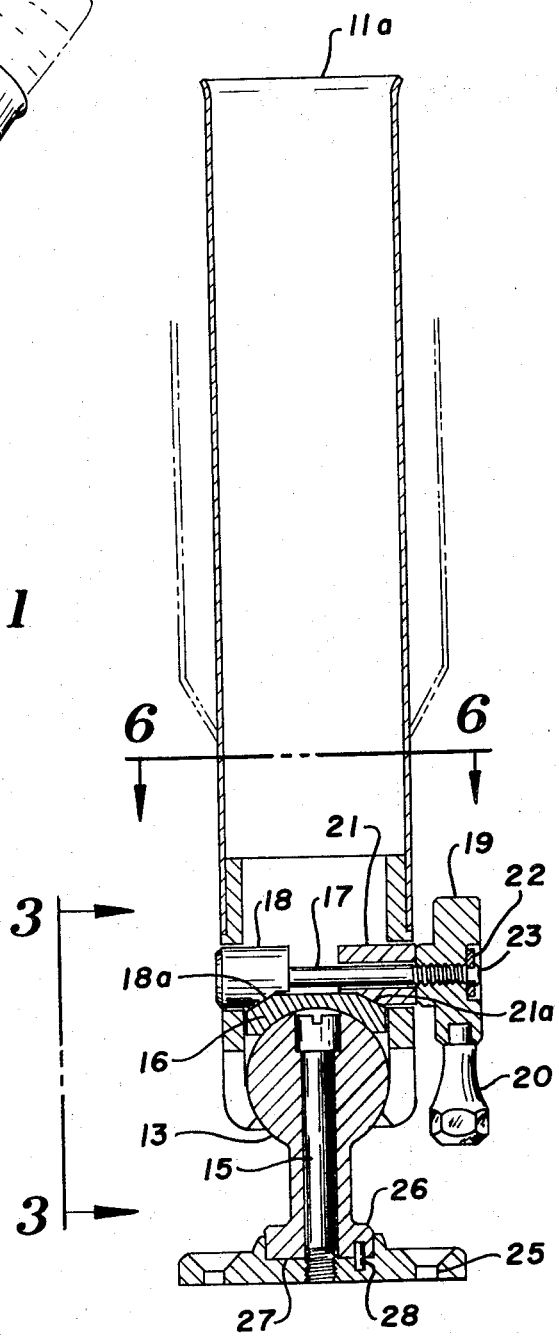
FIG. 2 is an elevational view of the device illustrated in FIG. 1, with a portion of the structure being diametrically cut away so as to illustrate portions in section, and with an optional holder configuration being shown in phantom.

In accordance with the preferred embodiment of the present invention, the fishing rod holder generally designated 10 includes a generally tubular cylindrical body portion 11 having a mounting plate 12 secured to the base thereof. A coupling ball 13 is secured to the plate 12, as is illustrated in FIGS. 1 and 2. A cap screw 15 is utilized to secure ball 13 to plate 12.

As is apparent in the drawings, tube element 11 has an open top 11a, with the bottom being closed due to the provision of the locking means secured therein. The details of the locking means will be disclosed hereinbelow.

Figure 6:
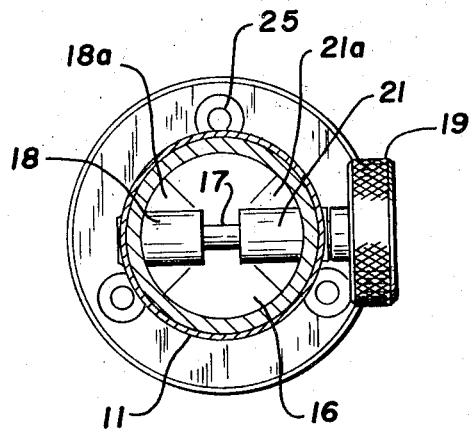
FIG. 6 is a horizontal sectional view taken along the line and in the direction of the arrows 6—6 of FIG. 2.

As is apparent in FIGS. 2 and 6, the ball 13 is secured to a hollow ball receiving socket formed in the base of tube 11. The base is cut away as at 14 to form a pair of bifurcation legs or ears 14a and 14b at the base of tube 11. The lower portion of the tube 11 is rolled inwardly as illustrated in FIG. 2 in order to complete the formation of the ball receiving socket.

Clamping means are provided to retain the ball and socket in locked disposition, with these clamping means comprising a generally diametrically arranged screw 17 having a head portion 18 at one end thereof and being threaded at the free end thereof. A locking nut 19 is provided having a radially extending gripping member 20 to assist in the clamping. A pair of mating clamping members are formed to engage the upper beveled surface of block 16, by means of the beveled portion formed in head 18, along with the beveled portion formed in cylindrical sleeve member 21. These beveled portions, as shown at 18a and 21a engage mating surfaces of compression block 16, and are accordingly utilized to force block 16 against ball 13 so as to form a secured clamped structure.

In order to prevent unintentional disassembly of the nut 19 from screw 17, the free end portion of the screw 17 is provided with washer 22, which is held in place by staking the end of screw 17 as shown at 23. It will be appreciated that other suitable mechanisms may be employed to retain the arrangement in desired disposition.

As is apparent in the illustration of FIG. 2, ball 13 is provided with a post portion which terminates in mounting base 26. Mounting base 26 is received within the cylindrical depression 27 formed in mounting plate 12. In order to secure plate 12 in desired disposition, a plurality of holes are formed as at 25—25 for receiving suitable mounting or retaining screws, as is apparent in the illustration of FIGS. 1 and 2. In order to prevent relative rotation between the ball 13 and the mounting plate 12, an extension or protrusion pin 28 is provided on base 26, pin 28 being, of course, eccentrically positioned.

Figure 4:
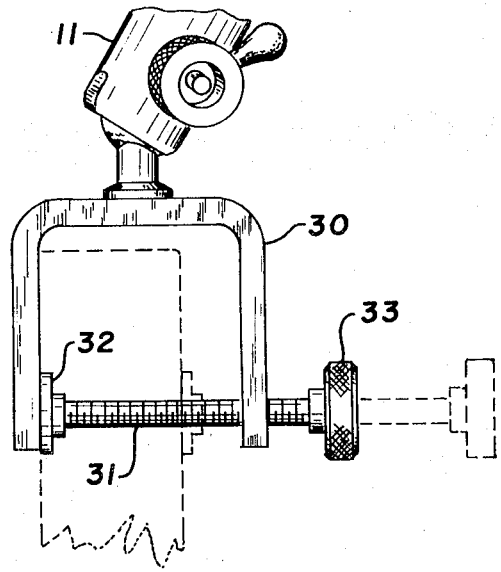
FIG. 4 is an elevational view of a portion only of a modified form of mounting means, and with the structure being illustrated in clamping engagement with a gunnel of a boat, with the mounting disposition being illustrated in phantom.
Figure 5:
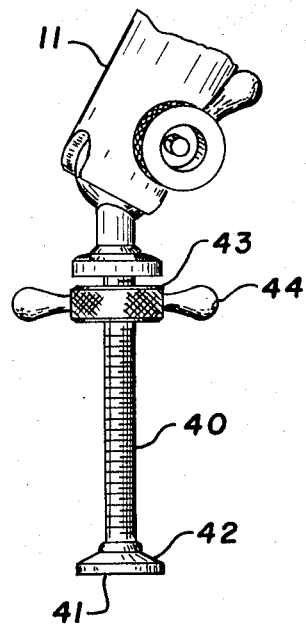
FIG. 5 is a view similar to FIG. 4 and illustrating a still further modified mounting means.

It will be appreciated that a variety of individual mounting members may be utilized, with certain of these being illustrated at FIGS. 4 and 5. In FIG. 4, the mount is in the form of a U-shaped shackle member 30 having a bore formed therein to receive threaded screw 31 having a foot member 32 which is utilized to engage a generally vertically disposed stationary object such as a boat gunnel or the like. Knurled knob 33 is provided at the free end of the screw 31, as indicated. The arrangement, when clamped to a boat gunnel, is illustrated in phantom in FIG. 4.

A still further modified form of mount is shown in FIG. 5, wherein means are provided for securing the element to an oarlock or the like. Screw 40 has a flared distal end portion 41 having tapered surfaces 42 arranged to engage the base of the oarlock or other sleeve-shaped mount. Knurled nut 43 is provided, to clampingly engage the structure in place on a stationary mounting sleeve such as an oarlock. Radially extending ears 44 may be provided to increase the amount of torque available to secure the unit in place.

In operation, therefore, the mounted rod holder is adjusted by merely relieving the forces urging beveled surfaces 18a and 21a against the mating surfaces of compression block 16. The tubular member 11 may then be moved to a desired disposition, whereupon member 19 is utilized to force beveled sleeve 21 toward head 18, thereby urging or forcing block 16 into firm engagement with ball 13. The concave coupling ball receiving opening centrally formed in the surface of block 16 provides the force necessary to hold compression block 16 against ball 13. In this disposition, therefore, the rod holder is capable of immediate use.

We claim:
1. Fishing rod holder means comprising:
   a. a tubular body member having a closed bottom and an open top;
   b. mounting means at the base of said tube having a mounting surface at the lower end and a coupling ball at the upper end thereof and means for preventing relative rotation between said ball and said mounting means;
   c. base coupling means for securing said tube to the mounting means and including sleeve extension for said tube with a hollow ball receiving socket being provided at the lower end of said extension, and with said base being cut away to form a ball engaging bifurcation with the distal ends thereof having radial portions extending arcuately inwardly to form a span less in diameter of said ball;
   d. clamping means cooperatively arranged with said ball and socket and comprising a generally diametrically arranged screw having a head at one end thereof and extending through the wall of said sleeve and with the free end extending outwardly of the wall of said sleeve, and a threaded clamping nut means engaging said screw;
   e. a compression block disposed between said ball and said clamping means and having a generally concave coupling ball receiving opening centrally formed into one surface thereof and a pair of bevels formed along opposite edges of the opposite major surface of said block; and
   f. a pair of relatively movable clamping members operatively mounted on said screw and each having flat beveled portions mating with the beveled edges of said block and arranged to be forced against said block beveled edges to urge said block toward said ball and in clamped relationship therewith.

2. The fishing rod holder as defined in claim 1 being particularly characterized in that said pair of relatively movable clamping members includes the head portion of said screw.

3. The fishing rod holder means as defined in claim 2 being particularly characterized in that one of said relatively movable clamping members is a sleeve mounted about said clamping screw.

* * * * *